(12) United States Patent
Haeussermann et al.

(10) Patent No.: US 7,155,773 B2
(45) Date of Patent: Jan. 2, 2007

(54) CLEANING HEAD FOR FLOOR CLEANING DEVICE

(75) Inventors: Uli Haeussermann, Fellbach (DE); Roland Jeutter, Berglen (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 11/249,762

(22) Filed: Oct. 12, 2005

(65) Prior Publication Data

US 2006/0068922 A1 Mar. 30, 2006

Related U.S. Application Data

(63) Continuation of application No. PCT/EP2003/013532, filed on Dec. 2, 2003.

(30) Foreign Application Priority Data

Apr. 16, 2003 (DE) ................ 103 18 820

(51) Int. Cl.
*A47L 5/10* (2006.01)
(52) U.S. Cl. .............. 15/390; 15/52.1; 464/35
(58) Field of Classification Search ........... 15/50.3, 15/52.1, 82, 385, 389, 390, 392; 464/35–37, 464/39; 192/55.1, 56.1, 69.5
See application file for complete search history.

(56) References Cited

U.S. PATENT DOCUMENTS

| | | | | |
|---|---|---|---|---|
| 1,805,692 A | * | 5/1931 | Ferenci | ............ 464/35 X |
| 2,668,426 A | * | 2/1954 | Hoover | ............ 464/37 |
| 2,730,220 A | | 1/1956 | Dodd | |
| 2,989,160 A | | 6/1961 | Woodruff | |
| 3,148,400 A | * | 9/1964 | Worwag | ............ 15/389 X |
| 3,319,749 A | | 5/1967 | Saeger et al. | |
| 3,552,147 A | | 1/1971 | Johansson et al. | |
| 3,958,679 A | | 5/1976 | Tamarin | |
| 4,041,729 A | * | 8/1977 | Bilz | ............ 464/35 X |
| 4,294,340 A | * | 10/1981 | Kunze | ............ 464/36 X |
| 4,311,224 A | | 1/1982 | Kato et al. | |
| 4,532,667 A | * | 8/1985 | Komesker et al. | ......... 15/390 X |
| 4,599,019 A | | 7/1986 | Ueberall | |
| 4,610,340 A | | 9/1986 | Helmes et al. | |
| 4,878,566 A | | 11/1989 | Hamada et al. | |

FOREIGN PATENT DOCUMENTS

| | | |
|---|---|---|
| DE | 1 575 735 | 1/1970 |
| DE | 29 34 164 | 3/1980 |
| DE | 37 35 823 | 5/1988 |
| EP | 0 108 930 | 5/1984 |
| EP | 1 197 671 | 4/2002 |
| GB | 964 494 | 7/1964 |
| GB | 1 404 759 | 9/1975 |

\* cited by examiner

*Primary Examiner*—Greg Binda
(74) *Attorney, Agent, or Firm*—Lipsitz & McAllister, LLC

(57) ABSTRACT

An overload coupling is provided for the limited transfer of torque in a floor cleaning device. A drive element and a driven element are arranged concentrically to one another, thereby forming an intermediate space. The intermediate space accommodates at least one coupling element which transfers torque and can be moved from the intermediate space into an alternative space contrary to the action of an elastic restoring force when an overload occurs. The overload coupling has an overload element which is spring-loaded in the direction of rotation of the coupling element and releases the alternative space for the coupling element when an overload occurs.

14 Claims, 3 Drawing Sheets

CLEANING HEAD FOR FLOOR CLEANING DEVICE

This application is a continuation of International application number PCT/EP2003/013532 filed on Dec. 2, 2003.

The present disclosure relates to the subject matter disclosed in International application number PCT/EP2003/013532 of Dec. 2, 2003 and German application number 103 18 820.7 of Apr. 16, 2003, which are incorporated herein by reference in their entirety and for all purposes.

BACKGROUND OF THE INVENTION

The invention relates to a cleaning head for a floor cleaning device with a rotatable brush roller which is coupled to a drive motor via an overload coupling, wherein the overload coupling transfers only a limited torque.

Cleaning heads of this type are used for floor cleaning devices, with the aid of which a floor surface to be cleaned can be cleaned, for example, can be brushed and vacuumed. The cleaning head comprises a rotatable brush roller which can be driven by a drive motor. An overload coupling is connected between the brush roller and the drive motor and this transfers only a limited torque. As a result, it is ensured that the transfer of torque is interrupted by the overload coupling when a predetermined limiting value is exceeded. Such an interruption occurs, in particular, when the rotation of the brush roller is blocked. On account of the overload coupling, the drive motor can continue to run uninterrupted and without it becoming overloaded even in the case of such a blocking of the brush roller.

Overload couplings are also designated as torque limiters or overload protection devices and are known as such from EP 0 108 930 B1. Torque can be transferred between two machine elements with their help, wherein this transfer is, however, interrupted when an overload occurs, i.e., when a maximum limiting value of the torque is exceeded. As a result, it may, for example, be ensured that the drive element is not damaged during any blocking of the driven element.

An overload coupling is known from DE 29 34 164 A1, with which several coupling elements in the form of steel balls are held in their coupling position, in which they transfer torque from the drive element to the driven element, by means of a thrust sleeve spring-loaded in axial direction. When an overload occurs, the thrust sleeve is acted upon by the steel balls with a thrusting force effective in axial direction so that it is deflected in an axial direction and, as a result, facilitates a radial movement of deflection of the steel balls, wherein the transfer of the torque is then interrupted. The overload coupling known from DE 29 34 164 A1 is of a complicated construction.

An overload coupling is known from U.S. patent specifications No. 3,552,147 and No. 2,730,220 which has a drive element and a driven element which are arranged concentrically to one another, thereby forming an intermediate space. The intermediate space accommodates a coupling element which transfers torque, wherein the coupling element can be moved from the intermediate space into an alternative space contrary to the action of an elastic restoring force when an overload occurs. The overload coupling also has an overload element which is spring-loaded in the direction of rotation of the coupling element and releases the alternative space for the coupling element when an overload occurs.

The object of the present invention is to further develop a cleaning head for a floor cleaning device of the type specified at the outset in such a manner that the overload coupling has a constructionally simple design, can be produced inexpensively and can be operated reliably.

SUMMARY OF THE INVENTION

This object is accomplished in accordance with the invention, in a cleaning head of the generic type, in that the overload coupling has a drive element and a driven element which are arranged concentrically to one another, thereby forming an intermediate space, wherein the intermediate space has at least one coupling element which transfers torque and can be moved from the intermediate space into an alternative space contrary to the action of an elastic restoring force when an overload occurs, and that the overload coupling has an overload element which is spring-loaded in the direction of rotation of the coupling element, releases the alternative space for the coupling element when the overload occurs and is arranged between the coupling element and the alternative space in a coupling position of the coupling element. The use of an overload element which is spring-loaded in the direction of rotation of the coupling element makes a construction of the overload coupling possible which is particularly simple from a constructional point of view and can, therefore, be produced inexpensively. Torque is transferred to the driven element by the drive element via the coupling element below a critical limiting value of the torque to be transferred. The transfer is brought about, in this case, under the influence of the spring force which is effective in the direction of rotation of the coupling element and with which the overload element is acted upon. The drive element, like the driven element and the at least one coupling element, executes a rotational movement about a common axis of rotation. If the torque exceeds a limiting value predetermined by the effective spring force, the overload element executes a movement relative to the drive element and/or the driven element, wherein it releases an alternative space for the coupling element which the coupling element can enter.

As a result of this, the coupling element transfers from its coupling position into a non-coupling position and the transfer of torque between the drive element and the driven element is interrupted. A limitation of the torque to be transferred is ensured by the overload coupling in a constructionally simple manner, wherein the critical limiting value of the torque can be predetermined by the spring force, with which the overload element is acted upon in the direction of rotation. In accordance with the invention, the overload element is arranged between the coupling element and the alternative space in a coupling position of the coupling element. This has the advantage that the access of the coupling element to the alternative space is blocked by the overload element and is released when an overload occurs. The overload coupling is therefore characterized by a reliable mode of operation.

In a preferred embodiment, the alternative space adjoins the intermediate space radially on its outer side. Since the coupling element, like the drive element and the driven element, executes a rotational movement during the transfer of torque, the arrangement of the alternative space on the radially outer side has the advantage that the transfer of the coupling element into the alternative space can be achieved by means of the centrifugal force acting on the coupling element. The arrangement of the alternative space on the radially outer side also has the advantage that the at least one coupling element is held automatically in the alternative space when an overload occurs on account of the centrifugal force acting on the coupling element without additional retaining elements needing to be used for this purpose.

It has proven to be particularly favorable when the overload element abuts on the coupling element in the coupling position thereof. In this respect, it may be provided for the overload element to cover the alternative space in the coupling position of the coupling element so that the coupling element cannot easily enter the alternative space. If the torque to be transferred exceeds the critical limiting value, the overload element releases the alternative space for the coupling element and the coupling element transfers into its non-coupling position.

The drive element and the driven element form an intermediate space between them. This is preferably designed as an annular space arranged between the drive element and the driven element.

A configuration which is particularly unsusceptible to malfunction may be preferably achieved in that the annular space accommodates several coupling elements, each of which has an overload element as well as an alternative space associated with it. Several coupling elements, which are arranged in the annular space and each of which has an overload element associated with it which releases an alternative space for the respective coupling element when an overload occurs, are used in this case for the transfer of the torque from the drive element to the driven element.

The overload elements associated with the various coupling elements are preferably connected rigidly, in particular, in one piece to one another.

In order to act on the overload element with a spring force, it is provided in one preferred embodiment for the overload element to be coupled to the drive element or the driven element via a torsion spring. The torsion spring may, in this case, be designed as a helical spring.

It has proven to be favorable when the torsion spring can be releasably connected to the drive element or driven element. This makes it possible, depending on the desired limiting value for the torque to be transferred, to use a torsion spring adapted to this limiting value.

In a particularly preferred embodiment, it is provided for the overload coupling to have an intermediate part, on which the at least one overload element is held so as to be non-rotatable and which is coupled to the drive element or driven element via the torsion spring. The intermediate part forms, in this case, a support for the at least one overload element. It is particularly advantageous when the at least one overload element is connected in one piece to the intermediate part.

The intermediate part preferably forms an intermediate flange and the at least one overload element is preferably secured to the intermediate flange in the form of an axially protruding projection. This facilitates a configuration of the overload coupling in a constructionally simple manner such that the drive element and the driven element are arranged in a radial direction so as to be offset relative to one another and to form an annular space between them, into which the at least one overload element dips in that this is secured to the intermediate flange of the intermediate part in the form of an axially protruding projection. The intermediate part may, in this case, be positioned in axial direction to as to be offset in relation to the drive element and/or the driven element.

The driven element is preferably of a star-shaped configuration and has a plurality of stop surfaces which are aligned at an angle to the direction of rotation of the coupling element and on each of which a coupling element abuts in the coupling position. In this respect, it has proven to be particularly favorable to design the driven element with a shell surface which is configured essentially in the shape of saw teeth and on which several coupling elements abut in their coupling position, wherein the coupling elements can be positioned at a distance in relation to the driven element when an overload occurs by transferring into their alternative position so that the coupling elements can be freely rotated relative to the driven element and, as a result, a transfer of torque is prevented.

In order to hold the driven element it may be provided for the overload coupling to have a driven flange, to which the driven element is secured, wherein the driven element forms a collar projecting axially from the driven flange. The collar preferably has a shell surface in the shape of saw teeth. In this respect, it is favorable when the driven flange is aligned parallel to the intermediate flange so that the intermediate space accommodating at least one coupling element is limited in axial direction, on the one hand, by the intermediate flange and, on the other hand, by the driven flange.

The radial limitation of the intermediate space may be brought about by means of the driven element and the drive element.

A gear wheel is preferably used as drive element and this surrounds the driven element in circumferential direction and, in an advantageous embodiment, forms the at least one alternative space for the coupling element on its radially inner side.

A particularly compact configuration is achieved in a preferred embodiment in that the overload coupling has a dome-shaped housing, to which the drive element is secured, wherein the driven flange forms a cover for the housing. The drive element is preferably connected in one piece to the dome-shaped housing. The housing can, in this respect, accommodate the at least one coupling element as well as the overload element and the spring element acting on it with a spring force, preferably in the form of a torsion spring, and is covered by the driven flange which, in a particularly preferred embodiment, supports a driven gear wheel on its outer side facing away from the housing, wherein it is particularly favorable when the driven gear wheel is connected in one piece to the driven flange.

The floor cleaning device, for which the cleaning head according to the invention is provided, may be designed as a brush vacuum cleaner, with the aid of which a floor surface to be cleaned can be brushed and vacuumed at the same time. In this respect, it is of particular advantage when the drive motor drives not only a suction fan of the floor cleaning device but also its brush roller. The brush roller is driven so as to execute a rotational movement about a brush axis of rotation. If the brush roller is blocked or obstructed, the use of the overload coupling enables the drive motor to continue to be driven uninterrupted and without any motor overload occurring. The operation of the suction fan is, consequently, not influenced by any obstruction or blocking of the brush roller.

The following description of a preferred embodiment of the invention serves to explain the invention in greater detail in conjunction with the drawings.

DETAILED DESCRIPTION OF THE INVENTION

Figure 1:
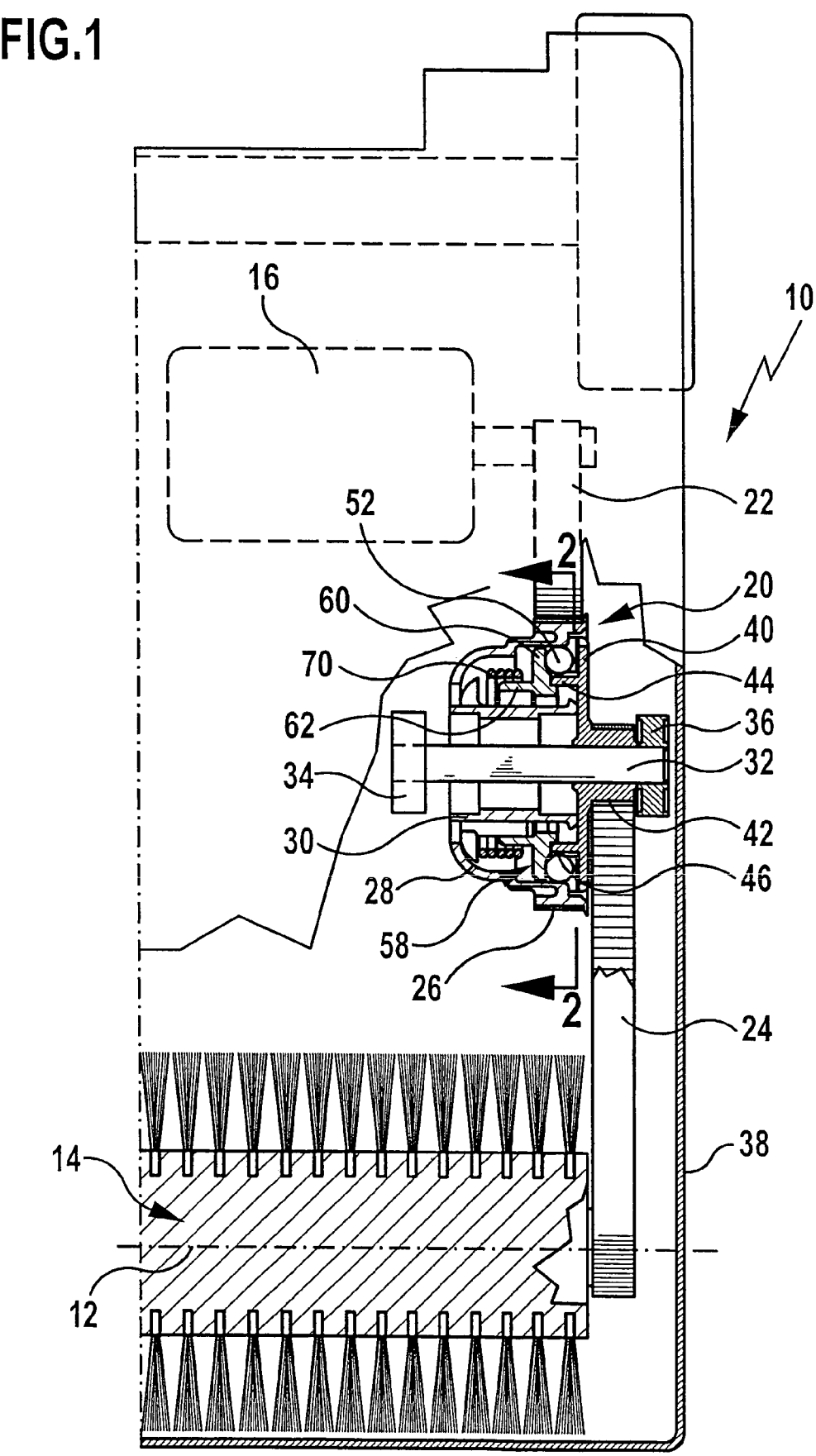
FIG. 1: shows a schematic, partially opened bottom view of a cleaning head according to the invention for a floor cleaning device with an overload coupling.

In FIG. 1, a cleaning head designated altogether with the reference numeral 10 is illustrated in a schematic manner; the cleaning head can be moved along a floor surface for the purpose of cleaning the floor surface, wherein the floor surface is brushed and vacuumed at the same time. For this purpose, the cleaning head comprises a brush roller 14 which is mounted so as to be rotatable about a brush axis 12 and can be caused to rotate by means of an electric motor 16. In addition, the cleaning head has, in a customary manner and not, therefore, illustrated in the drawings, a suction nozzle which is in flow communication with a suction unit which is known to the person skilled in the art and, therefore, likewise not illustrated so that the floor surface to be cleaned can be vacuumed by means of the cleaning head 10. The suction unit can have in the usual manner a suction fan which is, like the brush roller 12, caused to rotate by the electric motor 16.

The coupling of the brush roller 14 to the electric motor 16 is brought about with the interposition of an overload coupling 20 which is connected to the electric motor 16 on the drive side via a first toothed belt 22 and to the brush roller 12 on the driven side via a second toothed belt 24. The electric motor 16 can be integrated into the suction unit and is operatively connected to the brush roller for its rotary drive via the overload coupling 20. The suction fan may have a rotational speed of, for example, 25000 revolutions per minute (revs/min) while the brush roller 12 has only a rotational speed of, for example, 2800 revs/min. The overload coupling 20 described in detail in the following ensures that a possible blocking of the brush roller 12 does not lead to any interruption in the rotary drive of the suction fan by means of the electric motor 16. The overload coupling 20 serves, on the contrary, as an overload protection which interrupts the coupling of the brush roller 12 to the electric motor 16 during any blocking thereof.

The first toothed belt 22 is in engagement with a drive element of the overload coupling 20 in the form of a drive gear wheel 26 which is connected in one piece to a dome-shaped housing 28 of the overload coupling 20 and forms the outer edge of the housing 28. Aligned coaxially to the drive gear wheel 26, the overload coupling 20 has a sleeve 30 which is connected in one piece to the housing 28 and is supported on a bearing axle 32 passing through the housing 28 so as to be freely rotatable. The bearing axle is supported on an underframe 38 of the cleaning head 10 by means of bearings 34, 36 arranged at the ends so as to be rotatable.

The dome-shaped housing 28 of the overload coupling 20 is covered at its end face by a driven flange 40 which is connected in one piece to a driven gear wheel 42 which is supported on the bearing axle 32 so as to be non-rotatable. The driven gear wheel 42 is in engagement with the second toothed belt 24.

On its inner side facing the interior of the housing 28, the driven flange 40 bears an axially projecting driven element which is connected in one piece to the driven flange 40 and is designed as a star-shaped collar 44. The collar 44 has in circumferential direction a shell surface 46 which is essentially of a saw tooth-shaped design and faces an inner edge 48 of the drive gear wheel 26. The shell surface 46 and the inner edge 48 define between them an annular space 50 which accommodates a plurality of coupling elements in the form of steel balls 52 distributed uniformly in circumferential direction, in the illustrated embodiment eight coupling elements. Each steel ball 52 has a recess 54 associated with it which is integrally formed in the inner edge 48 and defines an alternative space 56 which adjoins the annular space 50 in radial direction adjacent each time to a steel ball 52.

Figure 3:
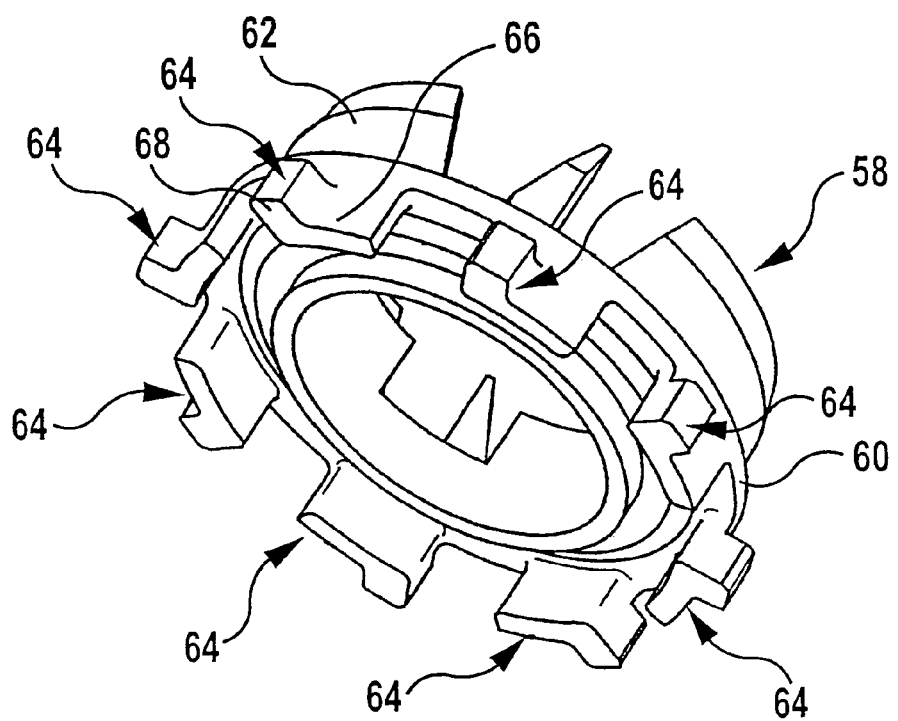
FIG. 3: shows a diagrammatic illustration of an intermediate part of the overload coupling.

The housing 28 of the overload coupling 20 encloses an intermediate part 58, the construction of which results, in particular, from FIG. 3. It comprises an intermediate flange 60 which is arranged parallel to the driven flange 40, is connected in one piece to a projecting sleeve 62 on its side facing away from the driven flange 40 and bears on its outer edge overload elements which are arranged equidistant to one another in circumferential direction in the form of projections 64 which protrude axially in the direction of the driven flange 40, are connected in one piece to the intermediate flange 60 and dip into the annular space 50, each associated with a steel ball 52. The projections 64 are, in cross section, approximately of an L-shaped design and comprise a first arm 66 which extends in the shape of a circular arc and concentrically to the inner edge 48 of the drive gear wheel 42 as well as a second arm 68 which is radially aligned and dips into a respective alternative space 56.

The housing 28 also encloses a torsion spring 70 which is of a helical shape and is secured, on the one hand, to the housing 28 and, on the other hand, to the projecting sleeve 62 of the intermediate part 58.

Figure 2:
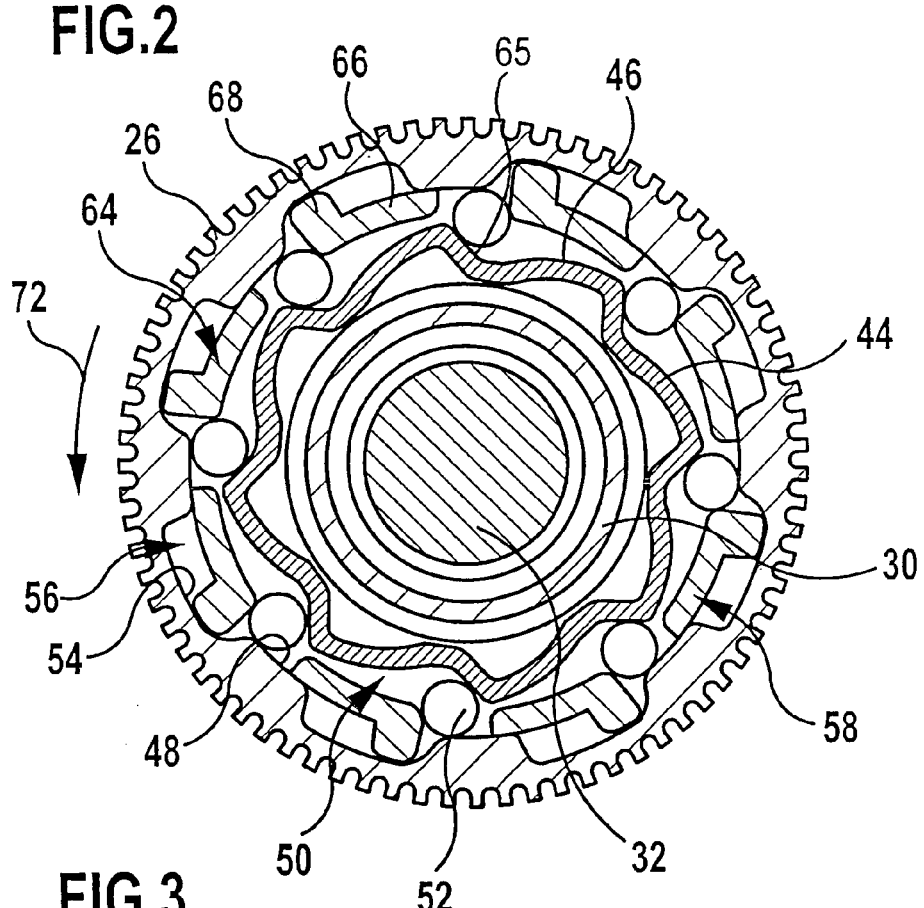
FIG. 2: shows a sectional view of the overload coupling along line 2—2 in FIG. 1 with active transfer of torque.
Figure 4:
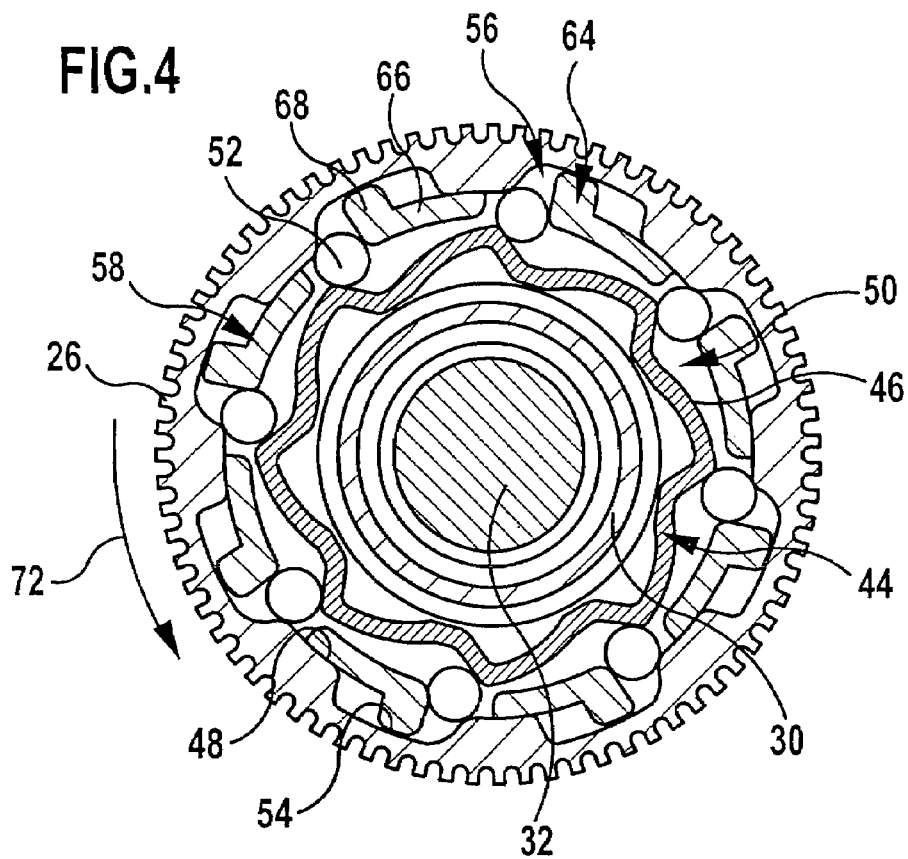
FIG. 4: shows a sectional view in accordance with FIG. 2 during the transfer of coupling elements of the overload coupling into an alternative space
Figure 5:
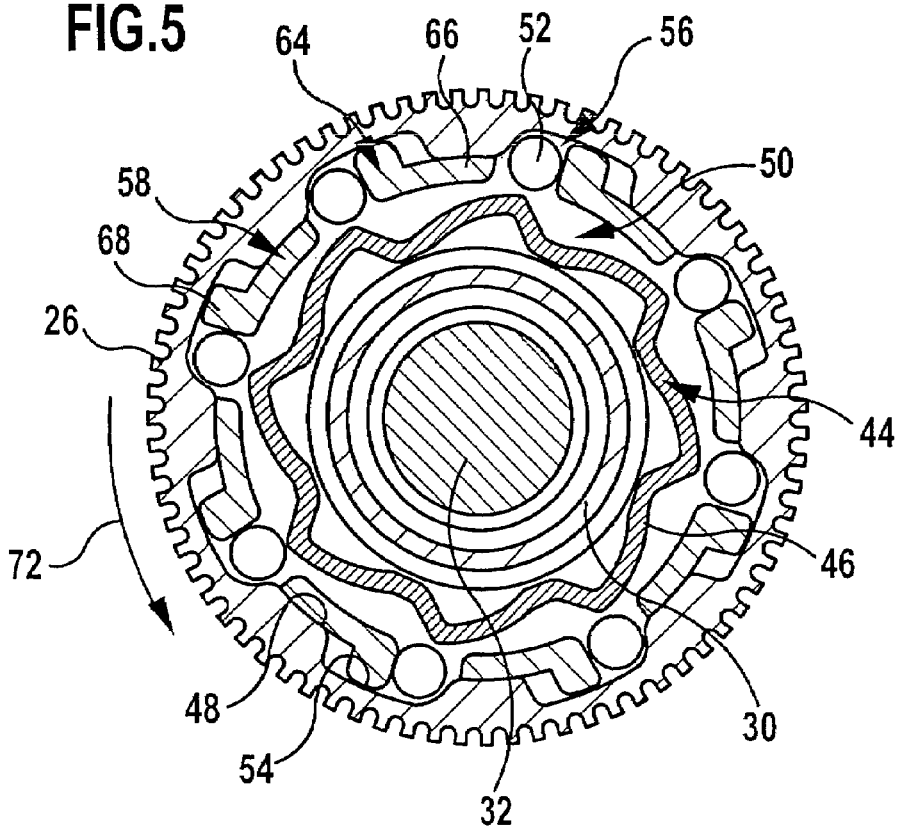
FIG. 5: shows a sectional view of the overload coupling in accordance with FIG. 2 after successful transfer of the coupling elements into the respective alternative space.

During operation of the cleaning head 10, torque is transferred to the drive gear wheel 26 from the drive motor 16 via the first toothed belt 22. The direction of rotation of the drive gear wheel 26 is represented in FIGS. 2, 4 and 5 by the arrow 72. This is connected in one piece to the housing 28, to which the torsion spring 70 is secured. The torque is transferred to the intermediate part 58 via the torsion spring 70. The torque is transferred by the projections 64 of the intermediate part 58 dipping into the annular space 50 to the steel balls 52 which abut on the second arm 68 of the projections 64 and, in their coupling position as illustrated in FIG. 2, cause the star-shaped collar 44 to rotate so that the torque is transferred via the driven flange 40 to the driven gear wheel 42 which is coupled to the brush roller 14 via the second toothed belt 24. A stop surface 65 is formed by the portion of the shell surface 46 that contacts the steel ball 52.

As is apparent from FIG. 2, the L-shaped projections 64 cover the alternative spaces 56 provided that the steel balls 52 are in their coupling position. The torsion spring 70 is tensioned with increasing torque load and so the projections 64 execute a relative movement with respect to the drive gear wheel 26. This results in the projections 64 gradually releasing the alternative spaces 56, as illustrated in FIG. 4. If the torque to be transferred exceeds a limiting value predetermined by the spring force of the torsion spring 70, the projections 64 spring-loaded by the torsion spring 70 release the alternative spaces 56 to such an extent that the steel balls 52 moving in the direction of rotation 72 pass into the respectively associated alternative spaces 56 on account of the gravity acting on them, wherein they no longer abut on the collar 44 in this position but rather release this completely. During sustained rotation of the drive gear wheel 26, the steel balls 52 are held in the respective alternative spaces 56 on account of the gravity acting on them, wherein torque is no longer transferred from the steel balls 52 to the collar 44. When a predetermined limiting value is exceeded, the transfer of torque is, therefore, interrupted by the overload coupling 20. Such an interruption occurs, in particular, when the rotation of the brush roller 14 is blocked. On account of the use of the overload coupling 20 for the cleaning head 10, as provided in accordance with the invention, the electric motor 16 of the cleaning head 10 can continue to run uninterrupted and without it being overloaded even with such blocking of the brush roller 14.

FIG. 5 illustrates the overload coupling after successful transfer of the coupling elements into the respective alternative space.

The invention claimed is:

1. Cleaning head for a floor cleaning device with a rotatable brush roller coupled to a drive motor via an overload coupling, wherein;

the overload coupling transfers only a limited torque, the overload coupling has a drive element and a driven element arranged concentrically to one another, thereby forming an intermediate space, the intermediate space accommodates at least one coupling element transferring torque, said coupling element being movable from the intermediate space into an alternative space contrary to the action of an elastic restoring force when an overload occurs, and the overload coupling has an overload element spring-loaded in the direction of rotation of the coupling element, said overload element releasing the alternative space for the coupling element when the overload occurs and being arranged between the coupling element and the alternative space in a coupling position of the coupling element.

2. Cleaning head as defined in claim 1, wherein the alternative space adjoins the intermediate space radially on the outer side of the intermediate space.

3. Cleaning head as defined in claim 1, wherein the overload element abuts on the coupling element.

4. Cleaning head as defined in claim 1, wherein the intermediate space is designed as an annular space arranged between the drive element and the driven element.

5. Cleaning head as defined in claim 4, wherein the annular space accommodates several coupling elements, an overload element as well as an alternative space being associated with each coupling element.

6. Cleaning head as defined in claim 5, wherein the overload elements associated with the various coupling elements are rigidly connected to one another.

7. Cleaning head as defined in claim 1, wherein the overload element is coupled to the drive element or driven element via a torsion spring.

8. Cleaning head as defined in claim 7, wherein the torsion spring is designed as a helical spring.

9. Cleaning head as defined in claim 7, wherein the overload coupling has an intermediate part, the at least one overload element being held on said intermediate part so as to be non-rotatable and said intermediate part being coupled to the drive element or driven element via the torsion spring.

10. Cleaning head as defined in claim 9, wherein the at least one overload element is connected in one piece to the intermediate part.

11. Cleaning head as defined in claim 9, wherein:

the intermediate part forms an intermediate flange, and the at least one overload element is secured to the intermediate flange in the form of an axially protruding projection.

12. Cleaning head as defined in claim 1, wherein the driven element is of a star-shaped design and has a plurality of stop surfaces aligned at an angle to the direction of rotation of the coupling element, a coupling element abutting on each stop surface in the coupling position.

13. Cleaning head as defined in claim 1, wherein:

the cleaning head has a driven flange, the driven element being secured to said driven flange, and the driven element forms a collar projecting axially from the driven flange.

14. Cleaning head as defined in claim 13, wherein:

the overload coupling comprises a dome-shaped housing, the drive element being secured to said housing, and the driven flange forms a cover for the housing.

* * * * *